July 4, 1933.  J. KISS  1,916,271
CHANGE DISPENSING MECHANISM
Filed Jan. 14, 1932  7 Sheets-Sheet 1

July 4, 1933. J. KISS 1,916,271

CHANGE DISPENSING MECHANISM

Filed Jan. 14, 1932 7 Sheets-Sheet 4

INVENTOR
*James Kiss*
BY
*Dean, Fairbank, Hirsch & Foster*
ATTORNEYS

July 4, 1933.  J. KISS  1,916,271
CHANGE DISPENSING MECHANISM
Filed Jan. 14, 1932  7 Sheets-Sheet 5

INVENTOR
*James Kiss*
BY
ATTORNEYS

July 4, 1933.  J. KISS  1,916,271

CHANGE DISPENSING MECHANISM

Filed Jan. 14, 1932   7 Sheets-Sheet 6

INVENTOR
*James Kiss*
BY
ATTORNEYS

Patented July 4, 1933

1,916,271

UNITED STATES PATENT OFFICE

JAMES KISS, OF BETHLEHEM, PENNSYLVANIA, ASSIGNOR TO KWICWAY MONEY CHANGER CORPORATION, A CORPORATION OF DELAWARE

CHANGE DISPENSING MECHANISM

Application filed January 14, 1932. Serial No. 586,537.

My present invention relates primarily to change-making apparatus and although in its broader aspects it is of wider application, the invention is more especially concerned with such apparatus that are of the key-set type.

An object of the invention is to provide an apparatus of the above character not apt to get out of order, even under severe conditions of use, of simple and rugged construction, all of the elements of which may be readily manufactured from inexpensive parts such as die castings, metal stampings and springs and which may be easily assembled.

Another object is to provide an apparatus of the above type characterized by compactness, a reduced number of coin stack receptacles, affording choice in the discharge of one or more coins from one and the same stack in a single change-making manipulation.

Another object is to provide change-making apparatus of the above type, obviating the use of a separate key for each sum or even for each multiple of five, and yet capable of use by at most two setting operations for discharging coins in any amount as desired, from one cent to one dollar.

Another object is to provide change-making apparatus of the above type which can be set for any sum up to one dollar without the need for any calculation however simple, the setting involving nothing more than selection of the successive digits of the amount, in a traverse from left to right of the keyboard.

Another object is to provide change-making apparatus of the above type, involving a minimum number of moving parts and correspondingly easy to the touch, devoid of complex transmitting linkages or wearing and hinging construction apt to cause looseness or unreliability in the machine, and in which the work in operating any of the respective keys is substantially equal regardless of the number and denominations of coins to be discharged.

Another object is to provide change-making apparatus of the above type which affords facility for checking the reading of the depressed key or keys prior to coin discharge, thereby affording safeguard against error.

Another object is to provide a machine of the above type so compact and small in all three dimensions thereof that it may be readily embodied in the drawers of cash registers even of the smallest models.

A feature of the invention is the use of elements directly to engage the coin ejector slides of the multi-stack magazine, said elements, which are preferably hinged pusher bars, being actuated by a common operating member to effect coin discharge, selective key members serving to set the elements that engage the coin ejector slides.

Another feature is the arrangement of the selective key setting elements in a single unit, affixed to the structure of the mechanism, each key having rigid therewith a part, preferably a notched plate, which directly engages and positions the corresponding slide engaging elements or parts.

Another feature is the automatic latching of any actuated key and its correlated selective plate in set position preliminary to coin discharge, which latter operation is effected by ejecting mechanism independently operated and preferably correlated to trip the key latch upon coin discharge.

Another feature is the use of decimal keys and units keys in the selective unit in a flexible keyboard, the decimal keys to the left and the units keys to the right of the keyboard, the associated selective plates being at corresponding portions of the unit for compactness.

Another feature is the straddling of the selector plates across the slide engaging elements thereunder which are operated from a common carrier bar.

Another feature is the correlation of the complete change making unit with a cash drawer of otherwise conventional design, by disposing the same in a gap cut away from the middle of the front of the drawer, with the support plate of the change maker secured under the floor of the drawer and the coin magazine exposed at the front of the drawer.

In the accompanying drawings, in which is shown one of various possible embodiments of the several features of the invention.

Referring now to the drawings, a preferred embodiment of the change-making device is shown, including a sheet metal rectangular base or support 20 having mounted thereon a coin magazine unit M, a discharge actuating unit D, and a key control selective unit K. The three elements or sub-assemblies will be described successively.

The magazine unit

This unit preferably comprises a die casting 21 embodying a series of individual coin stack receptacles arranged in a row of rearwardly inclined stack compartments 22 closed at the front by a glass panel 23.

The lower part of the casting is notched as at 24 laterally of each coin stack to accommodate a coin ejector preferably in the form of a coin receiving slide ejector plate or tray 25 retained at its edges in the corresponding notches and directed along guide-heel lugs 26 unitary with and extending rearward from the lateral edges of the respective stack receptacles. Each coin tray has an aperture 27 therein just large enough to accommodate a coin of the corresponding denomination. A floor plate 28 secured to the casting by screws 29 maintains the slide trays in position and has curved notches 30 at its forward edge with which the respective coin ejecting trays are brought into registry in coin discharge operation.

Each coin receiving slide-tray is equipped with a spring 33 associated or assembled therewith to urge the tray rearward to coin trapping position against a corresponding stop finger 31 which engages the rear edge of the corresponding slide and is affixed by screws 32 to the corresponding guide-heel lug 26 of the magazine casting. The springs 33 are preferably coiled about straps 34 in the respective plates, each strap determined by a pair of parallel contiguous slots 35 cut into the plate 25, the bottom plate 28 being notched as at 36, to accommodate the corresponding springs, which react at their forward ends against the shelf 37 of the magazine unit and the inner edge 36' of the floor plate notch 36.

In a preferred embodiment shown there is provided but a single stack receptacle for the smallest and thinnest silver coin, the dime, in United States currency. Inasmuch, however, as in the change-making operation a choice of ejecting one or two dimes is required, the dime stack is provided with a composite coin trapping slide comprising two superposed slide pieces 25' and 25² generally similar to that described, each receiving but one dime and the two slides in normal position receiving the two lowermost dimes of the stack. In this case the coil springs 33' and 33² of the corresponding slides are disposed laterally instead of centrally between the slide tracks and the plates are cut away by notches 40 and 41 respectively, each to accommodate the spring of the other plate.

In a preferred embodiment the arrangement just described in respect to the dime receptacle, would also be utilized for quarters, as illustrated at the stack receptacle Q which shows the same multiple tray ejector unit utilized at the dime stack D.

In the particular embodiment shown, the same composite arrangement is also utilized at the extreme right hand stack P' for pennies, affording a choice of one or two pennies, and the next penny stack P² has a slide 43 of double thickness, the operation of which will effect the ejection of two pennies, but which does not permit the ejection of a single penny.

The remaining stacks in the particular embodiment shown are stack H for half-dollars, and two stacks N' and N² each for nickels. By the arrangement of stacks described, the magazine within a very low construction of but three inches admits of a sufficiency of the relatively thin quarters and dimes though but a single stack be used for each, with the choice of ejection of either one or two coins of each of said denominations, and affords two stacks for each of nickels and pennies which coins are either thicker or normally used in greater numbers than dimes and quarters.

In the particular embodiment shown, the magazine unit is removably mounted on sheet metal support plate 20, the latter being provided with upstanding lateral clamping lugs 45, secured thereto by screws 46 and having edges 47 overlapping the lateral heel pieces 48 of the magazine unit and stop lugs 49 abutted thereby. Set screws 50 through lugs 45 clamp the heel pieces in position, for protrusion of the forward half of the stack receptacles beyond the forward edge of the support plate 20.

Discharge actuating unit

The coin slide or actuating means comprises a transverse carrying or cross bar 55 extending transversely over plate 20 with a pilot or guide bar 56 riveted to the underface thereof and lodged in the generally rectangular slot 57 in said support plate and engaging the end walls of said slot, whereby the sliding range of said carrying plate is limited by the forward edge 58 of said slot.

Actuating transmissions in the form of pusher arms or levers $p$ are pivotally mounted about a common wire 59 lengthwise of the cross bar 55 and are lodged in transverse slots 60 in said cross bar, and urged upward to inclined position by weak coil springs 61 in corresponding sockets 62 in said bar. The pusher arms thus normally extend above the respective coin slides 25, but are arranged for coordination one with each of the coin slide elements as described hereinafter.

Spring means preferably urge the carrier bar against the rear wall 63 of slot 57; said means preferably comprising a pair of coil springs 64 about rods 65 rigidly affixed in the cross bar 55 and extending forward therefrom into metal eyes 66 struck up from the base plate 20 and against which said springs react. A slide piece 55' attached to the underside of bar 55 and rearward therefrom under plate 20 maintains the parts against buckling relative to each other.

Any suitable means may be employed for advancing cross bar 55 for coin ejection, and the specific coin chute ejector shown in the drawings, and preferred, will be described under the corresponding title, hereinafter.

The selector unit

This unit comprises a long narrow casing K maintained above the respective pusher bars in straddling relation in respect thereto by unitary support legs 70 secured upon the base plate 20 immediately in back of the magazine unit.

The selector unit in the preferred embodiment has a keyboard at its top, comprising a double bank of keys preferably including each of the decimal denominations at the left half of the keyboard, preferably white keys to contrast with the keys of units denominations at the right half of the keyboard which are black. Each key is rigidly mounted upon the upper end of the flat shank 71 of a corresponding selective plate 72 having one or more operating lugs 73 protruding from the lower edge thereof through corresponding slots 74 in the bottom wall 75 of the casing K and directly above those of the pusher bars which actuate the ejector slides of denominations aggregating the value of the corresponding key.

The shank of each selector plate is stamped as a unitary part with said plate in the plane thereof and extends through slots 76 and 77 in the upper and lower walls 78 and 75 respectively of the casing. The casing is preferably provided with notched lugs 79 and 80 protruding upward from the lower and upper walls respectively thereof, to afford elongated slide bearing surfaces for the edges of the shanks 71, accurately to guide the vertical sliding movement thereof in operation.

Each shank 71 has an H-shaped slot 81 stamped therein affording tongues 82 mounting a coil spring 83 which reacts against the floor 75 of the casing and thus maintains the corresponding selector plate and its key in elevated or cleared position.

Figure 1:
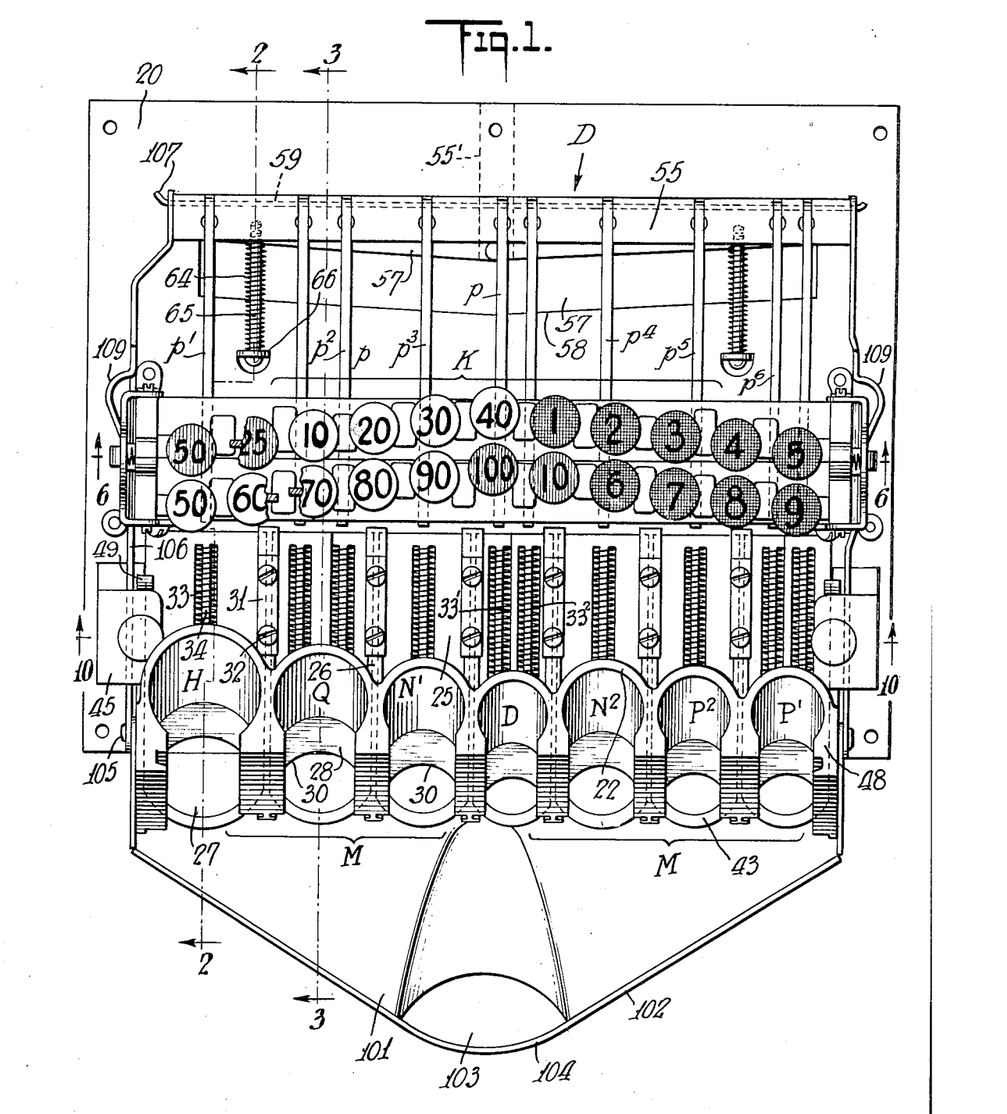
Fig. 1 is a plan view of the change-making mechanism with the cover plate thereof removed to reveal the interior construction.
Figure 7:
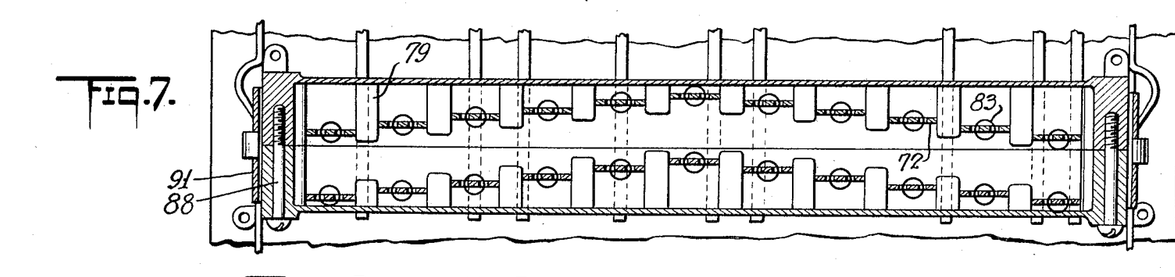
Fig. 7 is a view in longitudinal section taken on line 7—7 of Fig. 6.

The shanks of the successive selective plates 72 are laterally displaced, as shown and are in the planes of the respective plates, which in turn are parallel and close together as best shown in Fig. 7, thereby affording the characteristic relation of the vertical keys along a line slightly inclined to the length of the casing as best shown in Fig. 1.

Figure 8:
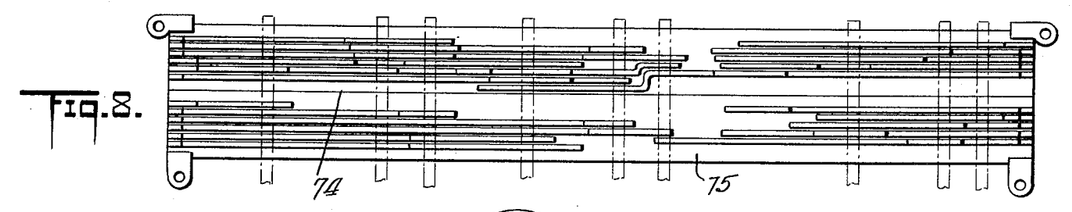
Fig. 8 is a bottom plan view of the selective unit.
Figures 9, 10:
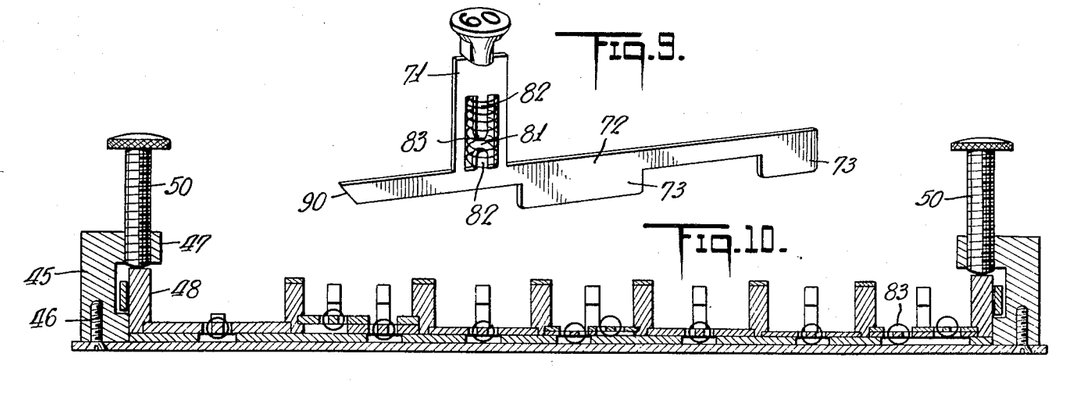
Fig. 9 is a perspective view of one of the selective plates and its associated key.
Fig. 10 is a transverse sectional view taken on line 10—10 of Fig. 1.
Figure 11:
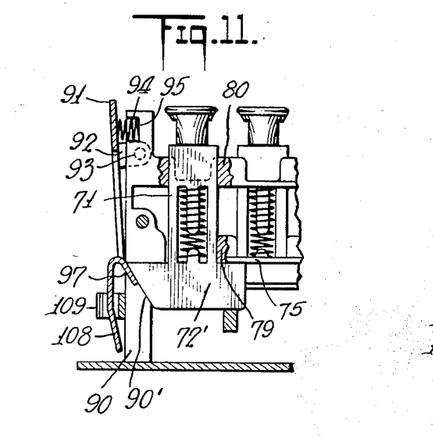
Fig. 11 is a fragmentary sectional view showing the selective mechanism.
Figure 12:
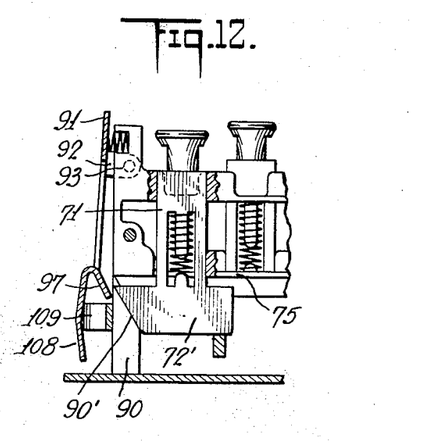
Fig. 12 is a view similar to Fig. 11 showing the mechanism with the latch being tripped.
Figure 13:
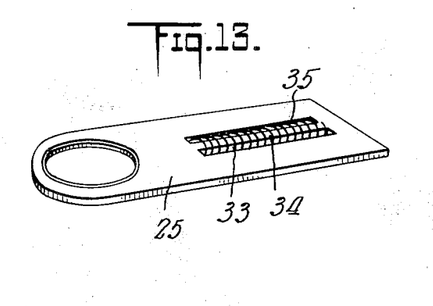
Fig. 13 is a perspective view of one of the coin trapping slides.
Figure 14:
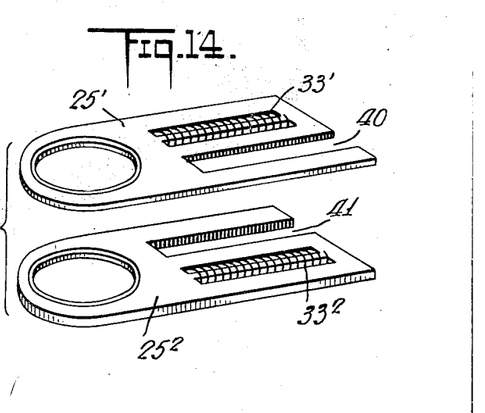
Fig. 14 is a similar perspective view showing the elements of a composite coin ejecting slide.
Figure 15:
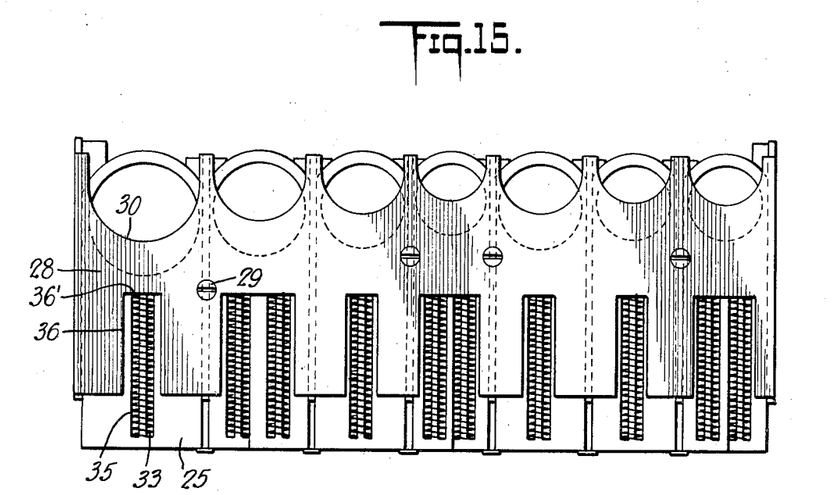
Fig. 15 is a bottom plan view of the coin magazine unit.
Figure 16:
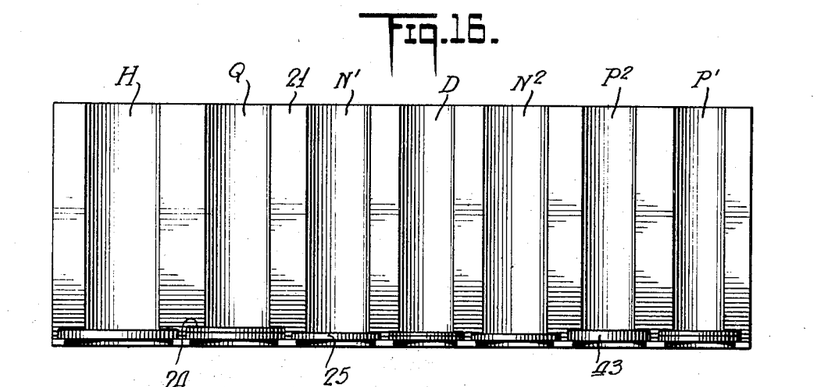
Fig. 16 is a front view of the coin magazine unit.

Preferably the decimal selector plates extend at the left half of the selector unit and the units plates at the right half, so that these plates may be aligned in pairs, as best shown in Fig. 8, without conflict and the attractive and convenient effect of the alignment of keys symmetrically along an obtuse angle, as best shown Fig. 1, results.

Preferably in addition to the white decimal keys and the black units keys, the keyboard includes a few red keys for special purposes. The middle key, the one marked 100 for instance, changes one dollar by delivery from four stacks, one half dollar, one quarter, two dimes and one nickel. The red ten cent key has a selector plate with lugs to depress the pusher bars for the two nickel stacks N' and N². It is also preferable to provide a red twenty-five cent key, the selector plate of which controls discharge of two dimes and one nickel, and a red fifty cent key which controls discharge of one quarter, two dimes and one nickel by depression of the pusher arms for the two ejector slides of the quarter stack receptacle Q.

Figure 6:
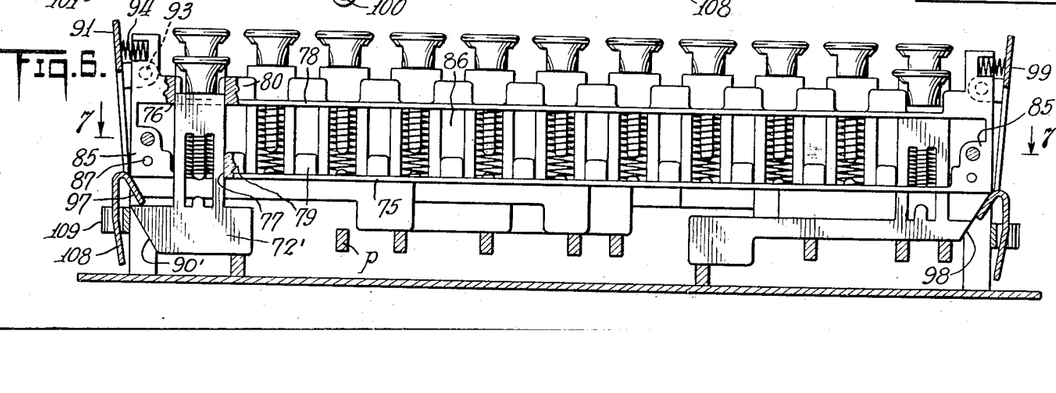
Fig. 6 is a transverse sectional view through the selective unit and taken along line 6—6 of Fig. 1.

In a preferred embodiment, the coin selector unit is built of two sub-units, one of which is best shown in Fig. 6. The casing of each sub-unit includes a top wall 78, a bottom wall 75, end walls 85 and a face wall 86. The two halves of the casing are correlated together by dowels 87 and are assembled to form the completed casing by screws 88 extending transversely through the end wall of one into the other, as best shown in Fig. 7. The legs 70 which are unitary with the casing are affixed to the base plate 20 by the screws (not shown).

Means is preferably provided for latching any of the selector plates in set or depressed position against the return impulse of its corresponding spring 83. For this purpose all of the decimal latch plates have aligned oblique cam ends 90 preferably at the left extremity of the plate. A common latch plate coacts with any of said cam ends 90 and comprises a simple metal stamping 91 having ears 92 straddling the end of the case K at the top thereof and pivotally positioned by screws 93 therethrough. The lower edge of plate 91 is bent inward to afford a latching tooth 97 across the ends 90 of plates 72 and in contact therewith as best shown in Fig. 6. A coil tension spring 94 is lodged in a corresponding socket 95 in the end wall of the casing at the upper part thereof and reacts against the upper arched edge of the latch plate, normally to force the lower end thereof under the bottom of the case K. Upon depression of any of the selective plates, for instance of plate 72', as shown in Fig. 6, the cam edge 90' thereof will pivot plate 91 outwardly about its hinges 93 against spring 94, releasing any plate that may have been left in depressed position, and after the upper edge of cam 90' has passed the edge of tooth 97, spring 94 will snap the latch plate back over the upper edge of plate 72', latching the latter and its corresponding operating key in depressed position.

The various selector plates of the units keys at the right half of the case also have oblique ends 98 at the right end of the casing and coact with a latching plate 99 identical with that just described, at the right end of the case.

Thus the keyboard is flexible and the machine admits of depressing and maintaining set simultaneously any decimal key and any units key to select any sum within the range of the apparatus, that is, by depression of at most two keys, a selection of coins for any sum between one cent and one hundred and nine cents is effected.

Coin chute ejector

While any suitable means might be employed for advancing the cross bar 55 of the ejector mechanism to bring about selected coin discharge, as for instance, the means generally shown in my prior application, Serial No. 145,953, filed November 3, 1926, of which this is a continuation in part, it is preferred to employ the particular improvement invented by Stephen J. Bachardy, and in itself claimed in the prior application, Serial No. 214,062, filed August 19, 1927.

According to this embodiment there is pivotally mounted by means of hinges 100 at the extreme forward edge of the support plate 20 a coin discharge chute 101 extending the width of the coin magazine and having a ledge 102 therearound and affording a discharge opening or spout 103 to deliver into the palm at the forward rounded end 104 thereof. The rear portion of the chute ledge 102 at each side of the apparatus has pivotally affixed thereto at 105 a pull bar 106 preferably extending under the support lug 47, rearward along the support plate and is affixed at the opposite end to the corresponding end of the cross bar 55, preferably by the protruding extremity 107 of the same wire 59 which pivotally mounts the pusher bars $p$.

Thus by depression of the pivoted coin chute, the carrier bar 55 of the coin discharge unit is advanced to cause the corresponding pushers $p$ to slide forward the associated ejector slides 25, releasing the corresponding coins, which drop by gravity along the downwardly inclined chute 101, through the spout 103, into the palm of the operator.

Preferably the key latch plates 91 and 99 of the selector mechanism are arranged to be tripped concurrently with the coin discharging operation. For this purpose it is preferred to provide a latch tripping lug unitary with the latch plate, conveniently in the form of a downturned tongue 108, cut out from the body of the latch plate. Tongue 108 is arranged to engage the corresponding pull bar and the latter is conformed with an outwardly turned camming hump 109 which is effective to urge tongue 108 outward and to trip the latch 97 at the end of the coin ejecting operation, permitting the springs 53 to urge the set selector plates and their keys back to cleared position.

Operation

Although the operation of the mechanism will be generally understood from the foregoing description, a typical operation will now be briefly set forth.

Assume it is desired to discharge the sum of eighty-seven cents. The operator simply depresses the decimal button 80 and the units button 7. By this depression the 80 button depresses pusher bars $p'$, $p^2$ and $p^3$ corresponding respectively to stacks H, Q and N' for ejection of a fifty-cent piece, a twenty-five cent piece, and a five-cent piece. The 7 key actuates the selector plate for depressing the pusher bars $p^4$ and $p^5$ for the stacks $N^2$ and $P^2$ to eject one nickel and two pennies.

Each of the keys 80 and 7 with its corresponding selective plate remains latched in depressed position by the action of the corresponding latch plates 91 and 99 respectively; thus affording a convenient check on the operation.

The operator now simply depresses the hinged chute 101 causing the carrier bar 55 to move forward against the resistance of springs 64, by tension transmitted through pull bars 106, causing the pusher bars $p$ depressed by the two keys; namely, bars $p'$, $p^2$, $p^3$, $p^4$, $p^5$ and $p^6$, to push the corresponding coin slides 25 forward, while the remaining pusher bars that remain inclined upward are ineffective with respect to their corresponding ejector slides. The corresponding coins are thus discharged into the palm of the hand.

Near the extreme end of the coin discharge movement, the cam humps 109 on the respective pull arms 106 effect tripping of the latch plates 91 and 99 by engagement at 108, and springs 83 effect return for clearing of the depressed decimal and units keys. Upon release of the hinged coin chute the springs 64 return the carrier bar 55 to normal position, thereby pulling back the coin chute 101 to horizontal; the coil springs 61 return the selected pusher bars to upwardly tilted position, and the springs 33 return the advanced coin slides 25 to home position. The apparatus is thus cleared and in readiness for the next operation.

In my change-making apparatus each selector key has but a single selective device, in this case a plate, under operable control thereof, and that plate is rigidly connected to the key, and has a slide bearing contiguous to the key. Thus there is no danger of cocking, jamming or binding, little operative effort is needed and that effort is substantially uniform for each of the keys.

The keyboard described, though it includes but twenty-two keys, affords the convenience of delivering coins in convenient denominations for any sum from one cent to one dollar and nine cents, and does this in each case by the actuation at most of two selective keys, a decimal key and a units key. Moreover, this setting operation requires no particular thought, and it is as convenient as writing a number. There is depressed a decimal key at the left, and a units key at the right, which completes the setting operation. The setting of the keys affords a convenient check as to the correctness of operation.

The speed of the machine, moreover, is not retarded by the provision of long gravity chutes or by dependence on the customer to remove the change therefrom. It can be operated as fast as the operator desires for withdrawing the selected coins therefrom.

*Cash register installation*

Figure 2:
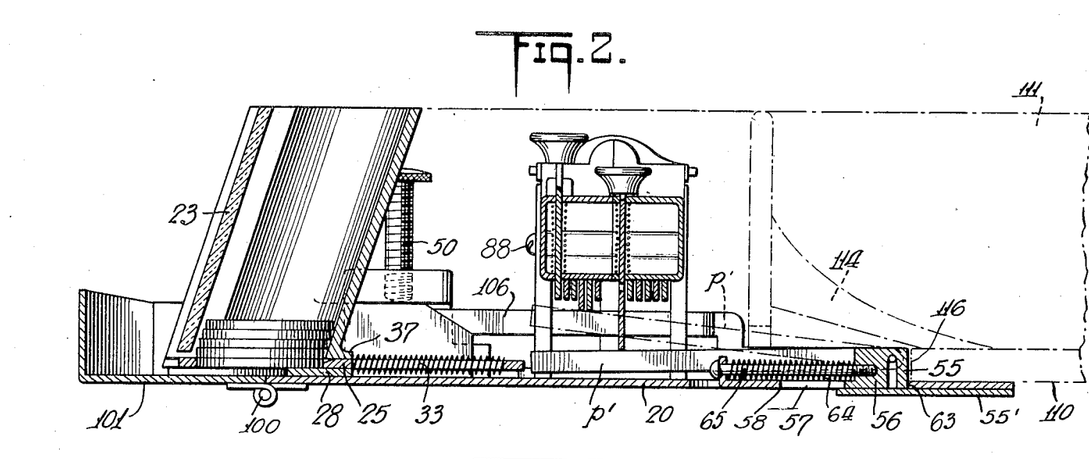
Fig. 2 is a transverse sectional view on a larger scale taken on line 2—2 of Fig. 1.
Figure 3:
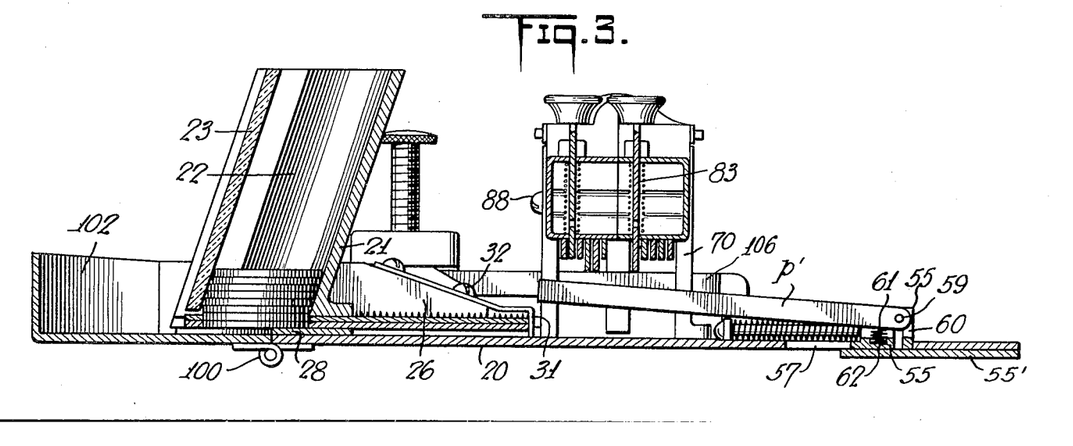
Fig. 3 is a similar view taken along line 3—3 of Fig. 1.
Figures 4, 5:
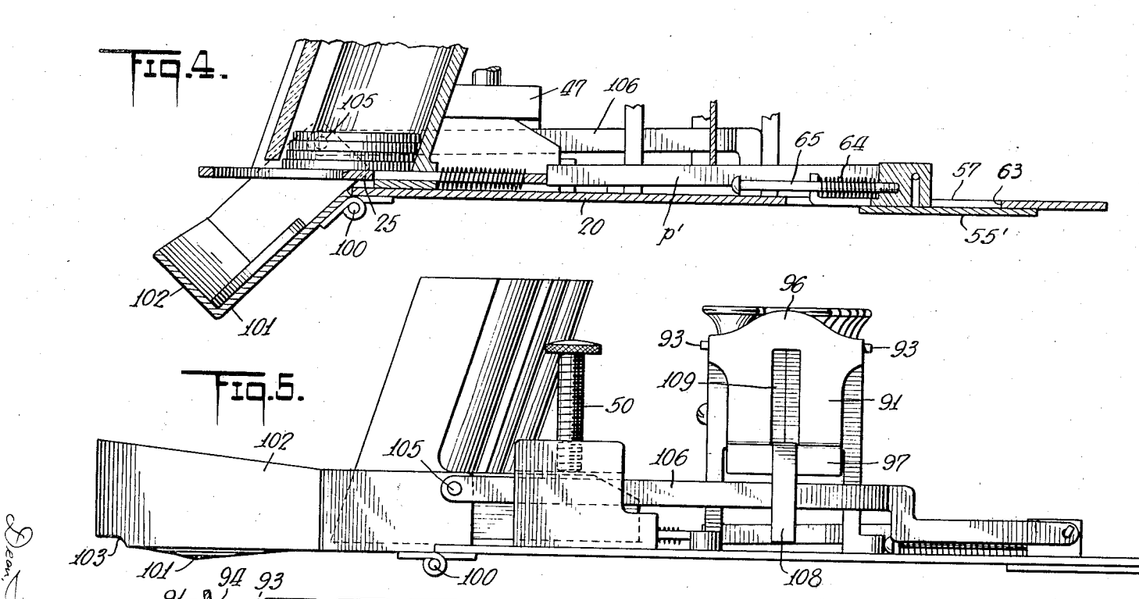
Fig. 4 is a view generally similar to Fig. 3, indicating the position of parts in ejecting operation.
Fig. 5 is an end view of the change-making apparatus.
Figure 17:
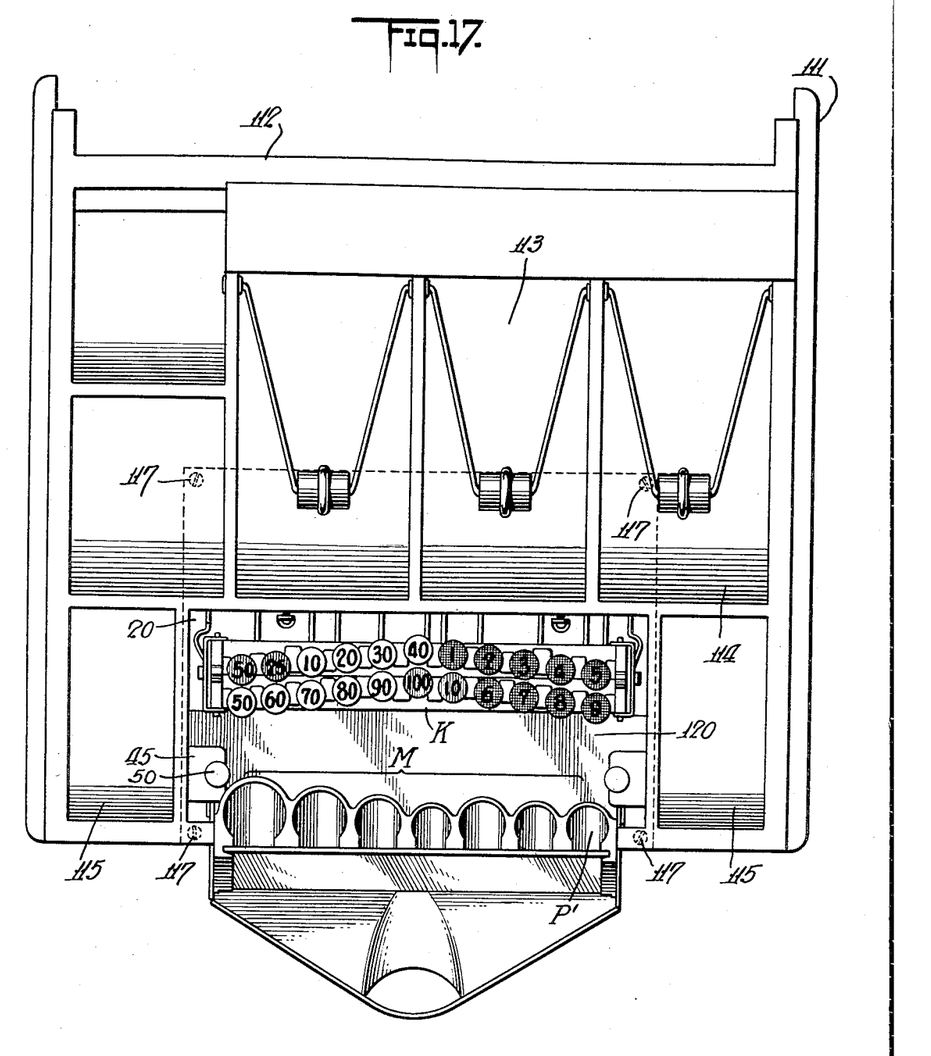
Fig. 17 is a plan view showing the mechanism installed in a cash register drawer.

The change-making unit as described, is applicable for counter, desk or table use, apart from any cash register for which use it would be enclosed in an appropriate casing. By reason of its compactness in all three dimensions thereof, the unit is however particularly suitable and adaptable for utilization in the drawers of cash registers of various models. It is suitable even for the standard type of cash register of the smallest commercial model, the drawer of which is illustratively shown in Fig. 17 of the drawings and diagrammatically in dot and dash lines in Fig. 2. That drawer comprises a bottom 110, side walls 111, and rear wall 112. It has bill compartments 113 in the rear thereof, with upwardly sloping front walls 114 and smaller coin compartments 115, two of which are shown at the forward corners of the drawer.

To adapt the drawer for embodiment of my change-making unit therein, no rebuilding is required but the front central part of the drawer with the corresponding bottom portion is removed and the floor of the drawer is cut back as at 116 under the false bottom afforded by the forwardly curved bottoms 114 of the bill compartments.

The base plate 20 of the change-making unit described, is mounted under and against the floor of the drawer, to which it is attached by appropriate screws 117 with the forward edge of said plate flush with the front of the drawer. In this relation, as shown, the carrier bar 55 of the ejector and the rearward hinged ends of the tilting pusher bars $p$ are accommodated under the upwardly sloping fronts 114 of the bill compartment floors.

The coin magazine is snugly disposed in the gap provided in the front wall of the drawer between forward compartments 115, and protrudes at its lower end forwardly from the front of the drawer, and the selector unit K within the drawer is accessible for convenient operation.

The mechanism of the change-making apparatus, by the installation set forth is in no way interlocked with that of the cash register, except that the cash register drawer must be opened before the selector mechanism can be set and coins discharged.

One of the inconveniences of the smaller cash registers is the insufficiency of room along the width of the drawer to accommodate coins of all denominations for equal accessibility from the front. By the present installation, individual stack compartments for the several denominations are provided, all at the very front of the drawer.

To protect the ejector slides 25 which are otherwise exposed when the drawer is open, a cover plate 120 is laid over them.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new, and desire to secure by Letters Patent is:—

1. In a coin dispensing apparatus of the type comprising a coin stack receptacle, a bottom plate thereunder, a slideway defined above said plate and below said receptacle, and a coin tray movable in said slideway and accommodating the lowermost coin of the stack and extending rearward from the receptacle; the combination in which a strap defined by a pair of slots longitudinally of said tray is encircled by a coil spring which reacts against the rear portion of said coin receptacle.

2. In a coin dispensing apparatus of the type comprising a coin stack receptacle unit having a bottom plate, a slideway between the unit and said plate, and a pair of superposed coin trays guided in said slideway and extending rearward; the combination in which each of said trays has a pair of contiguous longitudinal slots, each pair defining a strap, coil springs encircling the respective straps, each of said trays having a wide notch to accommodate the protruding width of the coil spring of the other tray, each of said coil springs reacting against the rear wall of the coin stack receptacle.

3. In apparatus of the character described, a selective setting unit comprising a case having a set of decimal selector plates therein, a set of unit selector plates therein, individual setting keys of corresponding denominations protruding from the case and rigid with the respective plates, springs associated with the individual plates to normally retain the same in cleared position, each of said plates having a cam nose unitary therewith, a hinged trip latch common to the noses of all the decimal plates and a second trip latch common to all the noses of the units plates.

4. In a change-making apparatus, the combination of a casing having upper and lower walls, a series of decimal selective setting plates extending in parallel relation lengthwise of the casing and along the left half thereof with appropriate setting lugs to protrude from the lower wall of the casing, a series of unit selective setting plates extending in parallel relation lengthwise of the casing and along the right half thereof, with appropriate setting lugs to protrude from the lower wall of the casing, the respective unit selective plates being substantially in the plane of corresponding decimal selective plates, each of said plates having a flat shank unitary therewith protruding upward through slots in the lower and upper walls of the casing for parallel vertical motion thereof, the various shanks being in the planes of the respective plates and the successive shanks being displaced from each other longitudinally of the casing, and operating keys with corresponding designations affixed to the upper exposed ends of the respective shanks.

5. In a change-making apparatus, the combination of a selective setting unit comprising an elongated casing, said casing constituting two distinct sub-assemblies, each including end walls, a top and a bottom wall and a single face wall, each of said casing assemblies including a series of parallel selective decimal plates disposed at the left half of the casing element and with operating lugs protruding from the lower ends thereof, a series of selective units plates disposed at the right half of the casing element and with operating lugs protruding from the lower ends thereof, the decimal plates and the units plates being aligned, each of said plates having a shank in the plane thereof protruding upward through corresponding slots in the lower and upper wall elements of the casing, said shanks being in the respective planes of the plates and spaced from each other longitudinally of the casing, each of said shanks having an associated coil spring to maintain the plate normally in cleared position, operating keys on the respective upper ends of the shanks, the two sub-assemblies being attached together in alignment to form a unit with a double bank keyboard at the top thereof and a series of operating lugs protruding from the bottom thereof.

6. In a change-making apparatus, the combination of a selective setting unit comprising a casing having a series of selective setting plates therein extending lengthwise thereof, each selective plate having a key affixed to the upper end thereof and having downwardly extending setting lugs, said selective plates being in two sets, a set of decimal plates and a set of unit plates, said former set having aligned latching cams, said latter set having aligned latch cams, said two sets of cams spaced from each other, and two trip latches arranged for coaction respectively with any of the cams of the decimal and with any of the cams of the unit plates, each latch hinged to trip any set key by the operation of another key of the same group.

7. A coin ejecting apparatus, including a carrying plate, a coin magazine at the front thereof having stack receptacles of different denominations, each including a coin receiving slide extending rearward therefrom, a transverse bar slidably mounted on said carrying plate and having pusher levers hingedly mounted thereon and springs associated therewith urging the forward ends of said levers above the level of said slides, a selective setting unit affixed to said plate and straddling said levers, said unit comprising selective setting plates vertically arranged transversely of the base across said pusher levers, each plate having a key for control thereof, latch means to maintain any set key and its associated plate in depressed position, and operating means for advancing the transverse bar to shift the selected coin slides forward through the pushing action of the set pusher levers, and means under control of said operating means to trip the latch means and clear the keyboard upon coin discharge.

8. A change-making apparatus, comprising a coin magazine unit having coin ejector slides assembled therewith, a coin slide operating unit including pushers in back of said magazine unit, and a selective setting unit straddling said pushers, comprising a keyboard, each key thereof having a single selective plate secured thereto, latch means for retaining a selected key and its plate in depressed position, operating means for advancing the selected pushers to move the coin slides to discharge position, said operating means having a latch tripping element associated therewith to clear the setting unit upon coin discharge, each of said coin ejector slides, each of said pusher members, each of said selective keys, and said operating means having return springs associated therewith automatically to restore the apparatus to neutral position after each coin discharge.

9. A change-making unit adapted for installation in a cash register drawer, said unit comprising a support plate, a coin magazine unit mounted in front of said plate and having coin receiving slide trays assembled therewith and at the bottom thereof, a slide ejector unit comprising a cross bar having portions near the ends thereof extending into corresponding openings in said plate to limit the range of forward and backward movement thereof, pushers hinged to said plate and extending forward therefrom, a selector unit comprising a casing having support legs at the ends thereof and mounted on said plate to straddle said pushers, said casing including a flexible keyboard with decimal keys and units keys, each key having a single selector plate associated therewith for depressing the corresponding pushers, and operating means for shifting the cross bar through its stroke, said operating means having tripping means associated therewith for clearing the keyboard after operation thereof.

10. In a cash register, a drawer of otherwise conventional form having the forward portion thereof removed at its middle, and having a change-making unit installed at said removed portion, said unit comprising a sheet metal base extending under the drawer and affixed to the bottom thereof, an operating mechanism occupying the cut-away space, said mechanism including a coin magazine unit having a line of stack receptacles at the front portion of the drawer, and a keyboard in back of said magazine and having selective control plates associated therewith for determining the stacks from which coins are to be ejected.

11. In a cash register drawer of the type including rear bill compartments with upwardly sloping forward walls, and front coin compartments, the central coin compartments at the front of the drawer, and the corresponding bottom and front portion of the drawer being removed, a change-making unit including a sheet metal bottom secured under the floor of the drawer at the removed portion thereof and having its rear portion under the sloping fronts of the bill compartments, a coin magazine having stack compartments arranged in a row at the front portion of said unit and of said drawer, each including a coin receiving ejector tray slidably mounted over said sheet metal bottom, tray actuating means including a cross bar near the rear of said plate having pusher bars hinged thereto with springs urging the latter to upwardly inclined position, said bar and the rear portions of said pushers extending under the forwardly inclined floors of said bill compartments, and a key operated selector unit carried by said base behind said magazine unit and straddling said pusher bars, said change-maker unit including operating means for advancing the cross bar with its set pusher bars relative to said magazine for coin ejection.

12. In a change-making apparatus, a support base member, a carrier bar extending substantially the length thereof and having a longitudinal extension fitting into a slot in said base of width greater than that of said bar, spring means urging said bar for abutment against the rear of said slot, pusher rods hinged transversely of said carrier bar, springs lodged in said carrier bar and tilting said pusher bars obliquely upward, and means associated with said carrier bar for moving the latter.

13. A money paying machine comprising a multi-stack coin magazine unit having coin ejector slides, an ejector actuating unit including slide-engaging elements, keys each having an element arranged directly to engage certain of the slide-engaging elements, and a common operating member for actuating said slide-engaging elements.

14. A money paying machine comprising a multi-stack coin magazine unit having coin ejector slides at the bottom of the respective stacks, an ejector actuating unit including pusher elements corresponding to the respective slides and to the rear thereof, a selective unit comprising a key board, each key having an associated element arranged under depression of such key, directly to engage and shift to effective position such of the pusher elements as correspond to the value of the key, and a common operating member for actuating all of the pusher elements to thereby advance those of the coin slides corresponding to the said pusher elements.

15. A money paying machine comprising a multi-stack coin magazine unit having coin ejector slides, an ejector actuating unit including slide-engaging elements, a selective unit comprising a flexible key board having decimal keys and units keys, each of said keys having a selective setting element directly to engage certain of the slide-engaging elements, latch means for engaging and retaining said setting elements in set position, operating means for actuating said slide-engaging elements, and means associated with said operating means for tripping the respective latches near the end of the operation.

16. A money paying machine comprising a multi-stack coin magazine unit having coin ejector slides, an ejector actuating unit including slide engaging elements corresponding to the respective ejector slides, each slide-engaging element normally out of the plane of the corresponding ejector slide, a selective unit straddling said ejector actuating unit and having keys, elements rigid with the respective keys by which the slide-engaging elements corresponding to the value of any selected key are directly moved to effective position, and means for operating said ejector actuating unit.

17. A setting unit for a change-making machine comprising an elongated casing having a double bank key board thereon including decimal keys and units keys, each key of said key board having a shank slidably disposed in the casing and including a notched selector plate protruding from the face of said casing opposite said key board, each of said plates having a latching conformation, the latching conformations for the decimal keys being aligned and those for the units keys being aligned and separate spring urged latches carried by said casing, one arranged for coaction with the latch of any of the decimal keys, and the other for coaction with the latch of any of the units keys.

18. A money paying machine including a multi-stack coin magazine unit, means for selectively ejecting coins from the respective stacks, said means including pusher elements, a selective setting unit including a flexible key board having decimal keys and units keys, parallel selective plates affixed to the respective keys, each plate having conformations for direct coaction with certain pusher elements, a latch for coaction with any of the plates of decimal value, a second latch for coaction with any of the plates of units value, a common operating member for advancing all of the pusher elements and thereby discharging coins from those stacks corresponding to the set pusher elements and means associated with said common operating member for tripping the latches upon completion of the coin discharge operation.

19. In a money paying mechanism of the class described, a series of ejectors, actuating means for the ejectors, a series of compartments forming a coin magazine with which the ejectors are associated and from which the ejectors are adapted to eject coins, and a coin chute pivotally connected with the ejector actuating means to effect action thereof, together with a support for said parts, the coin chute being tiltably mounted and being connected to the ejector actuating means so that, by tilting the chute, operation of the ejector actuating means is effected.

20. A money paying mechanism of the class described comprising a support plate, a coin magazine unit mounted at the front thereof and including coin ejector slides movable across the bottom of said unit, an ejector actuating unit on said plate rearwardly of said magazine having guide means slidable along said plate and stop means coacting with said plate to limit the slide thereof, a key controlled selecting unit straddling said ejector actuating unit for setting the latter, a hand operated coin chute at the front of said magazine, and transmission means between said chute and said actuating unit to operate the latter therewith, said stop means limiting the movement of said chute.

21. A money paying mechanism of the class described including a support plate having a coin magazine unit at the front thereof, said unit including spring retracted coin ejecting slides at the lower part thereof, a coin slide pusher unit comprising a carrying bar parallel to said magazine unit and slidable along said plate, said bar having forwardly extending pusher arms hinged thereto, a key controlled selecting unit bridging across said pusher arms, between said magazine unit and said carrying bar and having support legs affixed to said plate at the sides thereof, said selecting unit including means to latch the individual keys and the coacting pusher arms in position, and hand operated means for shifting said pusher unit to operate said coin ejectors and for releasing the latched keys.

22. A money paying mechanism including a support plate, a coin magazine unit affixed at the front of said plate and having spring retracted coin ejector slides at the lower part thereof, an actuating slide for said ejectors, said slide comprising a bar parallel to said coin magazine to the rear of and slidable toward said coin magazine, said bar having spring lifted selective pusher arms extending forward therefrom, spring means normally retaining said bar in retracted position, a key controlled selecting unit parallel to said bar and bridging across said pusher arms and having support legs sustaining the same upon said plate, said unit including selector elements therein and individual key retracting springs, means for latching the keys in depressed position, hand operated coin ejecting means accessible from the front of said plate, arms extending laterally therefrom and connected to said actuating slide for operating the latter, and means under control of said arms for releasing the latched keys.

23. A money paying mechanism of the class described, comprising a support plate, a coin magazine unit mounted at the front thereof and including coin ejector slides movable across the bottom of said unit, a key controlled selecting unit bridging across said plate and affixed at the ends thereof to the plate near the lateral edges of the latter and extending parallel to said magazine unit, an ejector actuating unit slidably coordinated for movement toward and from said magazine unit and having pusher arms hinged thereto extending under said selecting unit for coordination with the rear ends of said ejector slides, coin ejecting means protruding from the front of said plate, and transmission means between said coin ejecting means and said actuating unit to operate the latter from the front.

24. A money paying mechanism of the class described, comprising a support plate having lugs extending upwardly from the sides thereof, a coin magazine unit mounted at the forward edge of said plate retained in position at said lugs and having ejector slides, a key controlled selecting unit extending across said plate and having support legs at its ends affixed to said plate with the length of said selecting unit extending above said plate, an ejector actuating unit slidably mounted on said plate, said unit comprising a bar extending across said plate to the rear of said selecting unit, pusher arms hinged to said bar extending forwardly therefrom under said selective unit and to the rear of said ejector slides, a coin ejecting member movably mounted at the front of said plate, and lateral connector bars extending under said lugs and joining said coin ejecting device to the bar of said actuating unit.

Signed at South Bethlehem, in the county of Northampton and State of Pennsylvania, this 12th day of January, A. D. 1932.

JAMES KISS.